US010006663B2

(12) United States Patent
Orozco-Pérez

(10) Patent No.: US 10,006,663 B2
(45) Date of Patent: Jun. 26, 2018

(54) DEVICE DESIGNED TO MAXIMIZE THE EFFICIENCY AND MINIMIZE THE CONSUMPTION OF BOTH, WATER AND ENERGY, IN THE UTILIZATION OF HOT WATER

(71) Applicant: Juan Alberto de Jesús Orozco-Pérez, Mexico (MX)

(72) Inventor: Juan Alberto de Jesús Orozco-Pérez, Mexico (MX)

( * ) Notice: Subject to any disclaimer, the term of this patent is extended or adjusted under 35 U.S.C. 154(b) by 426 days.

(21) Appl. No.: 14/652,114

(22) PCT Filed: Dec. 12, 2013

(86) PCT No.: PCT/IB2013/002796
§ 371 (c)(1),
(2) Date: Jun. 13, 2015

(87) PCT Pub. No.: WO2014/096932
PCT Pub. Date: Jun. 26, 2014

(65) Prior Publication Data
US 2015/0316287 A1    Nov. 5, 2015

(30) Foreign Application Priority Data

Dec. 18, 2012    (MX) .................... MX/a/2012/015010

(51) Int. Cl.
| | |
|---|---|
| *F24H 9/20* | (2006.01) |
| *F24H 9/12* | (2006.01) |
| *F24D 19/10* | (2006.01) |
| *E03B 1/04* | (2006.01) |
| *G05D 23/13* | (2006.01) |
| *F24D 17/00* | (2006.01) |
| *E03C 1/00* | (2006.01) |
| *F28D 20/00* | (2006.01) |

(52) U.S. Cl.
CPC .......... *F24H 9/2007* (2013.01); *E03B 1/048* (2013.01); *F24D 19/1051* (2013.01); *F24H 9/126* (2013.01); *G05D 23/1353* (2013.01); *E03C 2001/005* (2013.01); *F24D 17/0031* (2013.01); *F24D 2220/042* (2013.01); *F28D 2020/0086* (2013.01)

(58) Field of Classification Search
CPC .......... F24H 9/122; F24H 9/124; F24H 9/126; F24H 9/2007; E03B 1/048; F28D 2020/0086; F24D 17/00; F24D 17/0031; F24D 19/1051; G05D 23/1353
See application file for complete search history.

(56) References Cited

U.S. PATENT DOCUMENTS

| | | | |
|---|---|---|---|
| 4,598,694 A * | 7/1986 | Cromer | .............. F24D 17/0021 122/19.1 |
| 4,692,592 A | 9/1987 | Kale | |
| 5,872,891 A | 2/1999 | Son | |

OTHER PUBLICATIONS

Written opinion of the international search authority (English translation).

* cited by examiner

*Primary Examiner* — Jonathan Bradford
(74) *Attorney, Agent, or Firm* — Karim Lagobi

(57) ABSTRACT

A system for mixing and delivering hot water at a user-selected temperature while minimizing consumption of energy and water, having a tank, which has a plurality of chambers adjacently arranged one on top of the other and contiguously connected in series; having solenoid valves on supply lines of cold and hot water to control water inflow to the tank's first chamber; and an algebraic thermometer, placed in the first chamber to send temperature information to a controller which includes a dispenser (metering unit) and outputs an electric signal to the solenoid valves.

10 Claims, 5 Drawing Sheets

DEVICE DESIGNED TO MAXIMIZE THE EFFICIENCY AND MINIMIZE THE CONSUMPTION OF BOTH, WATER AND ENERGY, IN THE UTILIZATION OF HOT WATER

BACKGROUND

1. Field of Invention

This invention is related to devices aimed to improve the efficiency and reduce consumption of energy and water, particularly in the utilization of hot water.

2. General Background of the Invention

Devices that seek to increase the efficiency in the consumption of hot water have been implemented in various ways throughout history.

Traditional combustion based water heaters for domestic, industrial and commercial use, as well as more modern solar and electrical ones are used on a daily basis. However, this utilization has failed to satisfy an increasing social awareness in ecological matters, given that their use is limited to the heating of water without tending to the increasing social need of economizing the cost and consumption of both, water and energy, in the process.

Within the everyday use of hot water required in the various domestic, industrial or commercial settings, for example in bathrooms, kitchens, etc. it has become customary to simply open the key or valve of the faucet and allow the cold or lukewarm water contained within the supply line to run until the temperature of the water coming out is high enough, only to then mix it again with colder water to balance the flow to the desired temperature. All the while, the whole of the water previously contained and running though the supply line before the flow reaches the user's desired temperature goes to waste in most cases, as it is seldom gathered in buckets to be subsequently used for sanitation, gardening, floors or patios cleaning and maintenance or other alternative applications. The volume of water wasted while the flow temperature rises to the desired point varies depending on the dimensions of the supply line. However, this amount is estimated to be of at least between 20 and 30 liters. As a matter of fact, some estimates reveal that a shower bath consumes between 60 and 150 liters of water, the most waste occurring in this case when maintaining the supply line open, for example, during the soaping stages. It is generally believed that if the keys are closed, it will be difficult to return to the desired water temperature. On the other hand, a shower bath could otherwise be completed with less than 20 liters of water.

Moreover, it is a common occurrence that when in a home or residence someone is taking a shower and another user opens a network key, the temperature of the service changes considerably, even to the point of being bothersome. For example, when flushing the toilet, the flow of cold water decreases in the network, drastically rising temperature of the person's shower head water.

Furthermore, the hot water contained in the heater, which supplies the service lines, is constantly being replaced by cold water. This process results in a significant drop in the water's temperature inside the heater, generating the need for increased energy use in order to recover the desired temperature.

Several studies have sought ways of reducing the large consumption of energy and water in these processes without meaningful results; some useful references to compare the present invention with prior technological or technical attempts at this include the following patents: The Chinese CN201680592 patent describes a water pre-heating device for a gas water heater, which takes advantage of the high combustion temperature to preheat the water from the tap, hence reducing water consumption.

In sum, the utilization of traditional combustion water heaters in domestic, industrial or commercial settings, even those referred to as tank-less, as well as more modern solar heaters have not been able to sufficiently improve the efficiency and cost effectiveness in the consumption of energy and water given that their storage capacity is restricted to their inner tank volume. This technical problem has not been resolved by prior art. Therefore, the invention described in this document proposes a device to maximize the efficiency and minimize costs in the utilization of water and energy in the water heating process comprising of a streamline manufacturing storage container, resulting in a low cost and easy production heavy-duty device.

SUMMARY OF THE INVENTION

Firstly, it aims to provide a product that maximizes the efficiency and minimizes the consumption of water and energy in the water heating process.

Secondly, this invention aims to provide said product, meant to maximize the efficiency and minimize the consumption of water and energy in the water heating process, at a low cost, given that it can be easily manufactured, has a reduced number of parts, and is also easy to install.

Thirdly, it aims to provide a resistant, compact and lightweight device to maximize the efficiency and minimize the consumption of water and energy in the water heating process.

Fourthly, it aims to provide a device capable of maximizing the efficiency and minimizing the consumption of water and energy in the water heating process which is compatible and targeted for existing hot water supply devices.

It also aims to provide a device capable of maximizing the efficiency and minimizing the consumption of water and energy in the water heating process which is easy to use and easy to operate.

Another objective of the present invention is to provide the user with a mixing container of varied dimensional choices to be used with the device capable of maximizing the efficiency and minimizing the consumption of water and energy in the water heating process, which is in agreement and fulfills each individual user's requirements.

Another objective of the present invention is to provide the user with the above mentioned mixing container comprised of several serial-connected storage chambers in order to increase the storage capacity of the preheated water, reducing the amount of hot water required to achieve the desired temperature.

Yet another objective of this invention consists in explaining the manufacturing process for the fabrication of the device capable of maximizing the efficiency and minimizing the consumption of water and energy in the water heating process.

In order to accomplish the above mentioned goals, it is necessary to successfully produce and provide a device capable of maximizing the efficiency and minimizing the consumption of water and energy in the water heating process characterized by comprising:

(a) A mixing container with a cold water inlet, a hot water inlet and a water outlet for the desired-temperature water on its back side; having an inner space that defines a water passage, preferably containing three detached-chambers to keep water at different temperatures, each situated above the other, incorporating vent pipes and water-level sensors. Each chamber is separated from the adjacent one through delimiters of predetermined slopes, but they remain interconnected to allow water to run within them by means of interconnection pipelines; said mixing container consists of a base and an upper deck, joined by any known means that result in it forming a single thermally-insulated piece;

(b) An algebraic thermal sensor, contained inside the first chamber along with the pipe that supplies both the cold and hot water coming from the electrical inlet valves module, which generates the signal for the first chamber's average water temperature and sends it to the control board.

(c) a water inlet to the device; and (d) a control board, consisting of a temperature selector knob, a start button and a set of indicator lights, which regulates the device's functions by means of the electronic circuit codification of the sensors' signals.

BRIEF DESCRIPTIONS OF THE DRAWINGS

Figure 9:
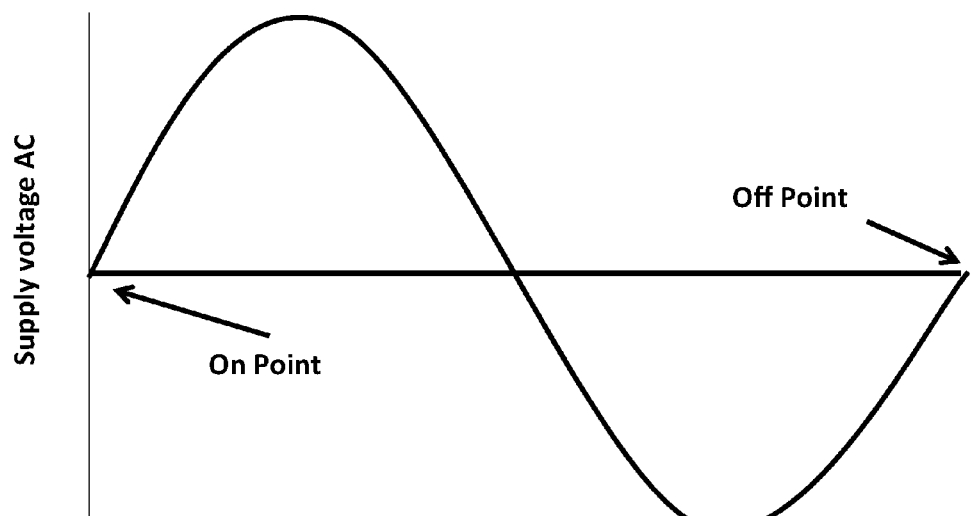

FIG. 9 presents the schematics of the operations control board's inner modules in the device meant to maximize the efficiency and minimize the consumption of water and energy in the present invention.

DETAILED DESCRIPTION OF THE INVENTION

Figure 1:
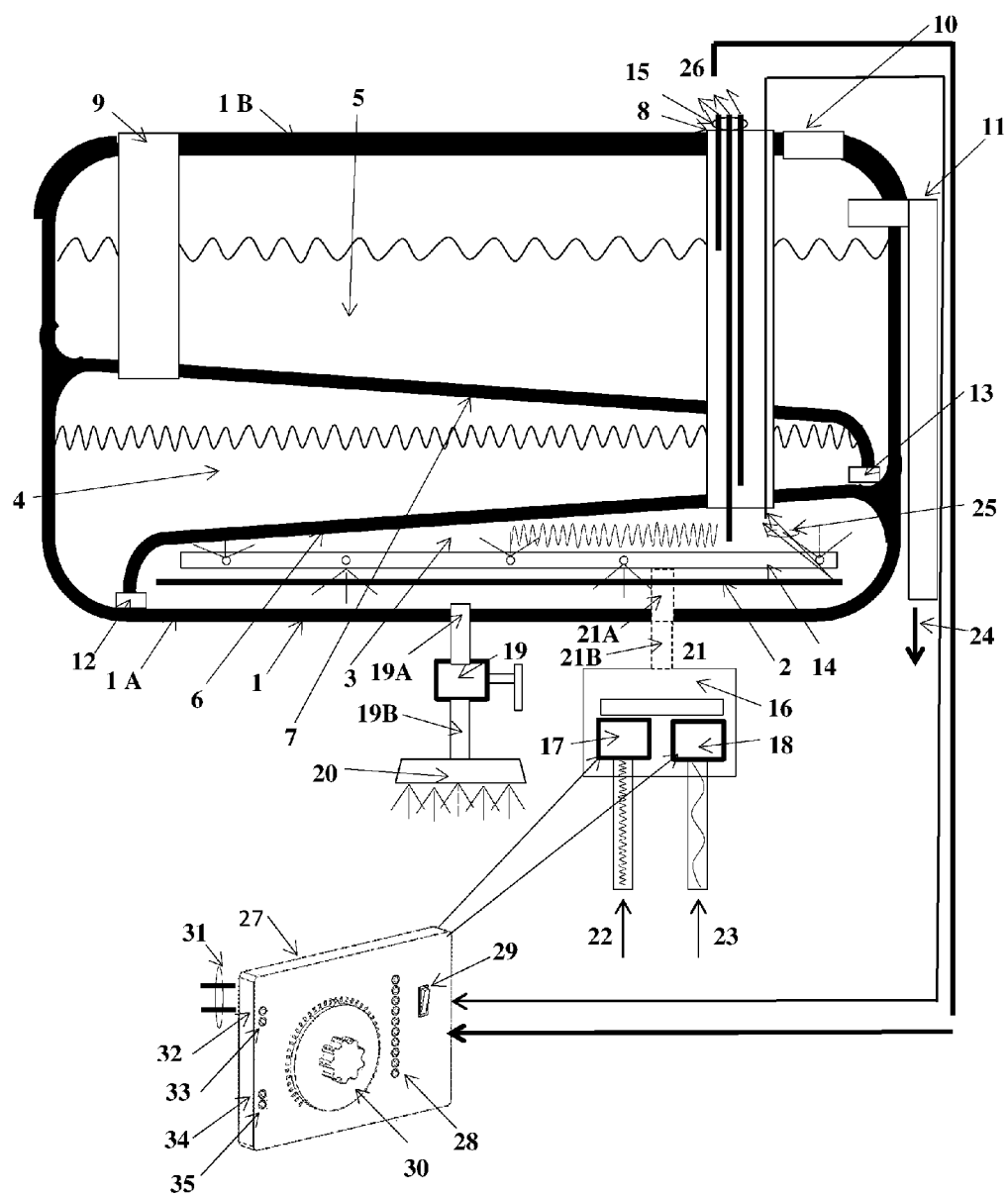
FIG. 1 shows a cross section view of the invention with the general components of the device meant to maximize the efficiency and minimize the consumption of water and energy, as required when applied to a shower head.

As a solution to maximize the efficiency and minimize the consumption of water and energy, the present invention relates to an optimized, easily manufactured and low cost device meant to maximize the efficiency and minimize the consumption of water and energy. Said device comprises a) a mixing container (1) of integral fabrication, substantially rectangular, preferably metallic (1A), with a detachable top cover (1B) both of them joined to form a single piece. The body (1A) can be manufactured, for example, died-cut, molded or welded in order to obtain a plurality of chambers, which are illustrated in FIG. 1 as chambers 3, 4, and 5), which are superimposed on each other and separated by their respective chamber delimiters (6 and 7) possessing of a determined slope preferably of 10% or higher for the direct flow of water and heat transfer, and joined by means of interconnecting ducts (12 and 13) arranged at the bottom of each one of the chambers' delimiters (6 and 7).

In conformity with the present invention, "cold water" is understood to be water at ambient temperature or lower, while the term "hot water" denotes water which has a temperature above 30° C.

In addition, said invention incorporates a lukewarm to hot water inlet and a cool to cold water inlet to the device, comprising: of a cold water inlet (23), a hot water inlet (22) an electronic valves-module (16), e.g. solenoid valves (17 and 18), which include a water access channel and speed-up valve coils, the main water supply inlet pipe (21) is composed of a first section (21A) inserted into the mixing container and composed of an external section (21B); and a dispersion pipe (14), which incorporates water outlet nozzles, hence establishing a circulating flow into the first storage chamber (3). Said chamber has a vent pipe as well (8) and either a thermometer or an algebraic thermal sensor (2).

The mixing container is completed with a second and a third storage chambers (4 and 5) arranged in superposition over the first one and separated by chamber delimiters (6 and 7) where the first chamber is connected to the second one by means of an interconnection pipeline (6) while the second chamber is joined in turn to the third one through a second interconnection pipeline (7); the outside of the mixing container may or may not incorporate an insulator of any known material to prevent heat loss. It is strongly recommended that the mixing container (1) is coated with insulating fiberglass in order to increase the heating system's efficiency as a whole.

The device is completed with a control board (27) preferably an electronic circuit of the pulse-dispensing type, with a general on-off switch (29), an electric-power input (31), indicator lights (28-A to 28-J), a temperature-selector-knob (30), a dynamic temperature indicator (28), a full-tank indicator (32), a lack-of-hot-water indicator (33), a lack-of-cold-water indicator (34), an empty-tank indicator (35), an analog temperature-comparison indicator (not shown), a dispenser-timing modulator (not shown), a PR—reference-clock pulse generator (not shown), a dispenser (not shown), output signal cables for the electro-levels (26), algebraic-thermal-sensor control lines (25), and coil activation lines of the solenoid valves (17 and 18) of the electronic valves-module (16).

Additionally, the device includes an outlet line (11) connected to a recovery tank (not shown) through the device's exit port (24).

The water at the user's desired temperature is supplied through the device's water outlet pipe (19A) towards the outlet valve (19), which is connected to a spout's extension (19B) to end at the inlet of the required service, represented here as a shower head (20).

Mixing Container

FIG. 1 illustrates the general components of the device aimed to maximize the efficiency and minimize the consumption of water and energy. Said device in this invention incorporates a mixing container (1) of integral fabrication, substantially rectangular, preferably of a metallic body (1A), with a detachable top cover (1B) joined into a single piece.

The body of the container (1A) can be died cut, molded or welded in order to obtain a cavity containing several chambers, preferably three (3, 4, and 5), arranged in superposition and separated through chamber delimiters (6 and 7) with predetermined slopes, preferably of 10% or higher for the water direct flow and heat transfer, attached to each other by means of interconnection pipes (12 and 13) located at the bottom of each chamber (4 and 5). In addition, the device in this invention incorporates a main water inlet comprising: a cold water inlet (23) and a hot water inlet (22), an electronic valves-module (16), integrating a water access channel and speed-up solenoid valves (17 and 18), the main water inlet pipe (21) composed of an external first section (21A) and a second section inserted into the mixing container (21B); and a dispersion water pipe (14), with water outlet nozzles at predetermined distances, which establish a circulating flow within the first storage chamber (3). This chamber has a vent pipe as well (8), and an algebraic thermal sensor (2).

The mixing container is completed with a second and a third storage chambers (4 and 5) arranged in superposition over the first chamber, and separated by delimiters (6 and 7) where the first chamber is joined to the second chamber by a first interconnection pipeline (12) and this second chamber is, in turn, joined to the third chamber by means of a second interconnection pipeline (13), the outside of the mixing container may or may not incorporate a fiberglass insulation coating, or an insulation coating of any other known material to prevent heat loss. It is strongly recommended that the mixing container (1) is coated with insulating fiberglass in order to increase the heating system's efficiency as a whole.

The principle of operation of the device is based on the water's thermal convection process, which refers to the movement of a liquid produced by thermal changes. When a liquid is heated it undergoes an expansion, and reduces its density, therefore, the heated molecules rise above colder more dense ones due to that difference in densities, with the hottest water remaining on the top portion of the first Chamber (3) and sending the water with lower temperature into the second chamber (4). In virtue of the disposition of the interconnection pipes (12 and 13) the convection phenomena makes it possible to have the coldest water rising from the first chamber (3) to the second chamber (4) through the first interconnecting pipeline (12) and then move further up into the third chamber as well (5) by means of a second interconnecting pipeline (13); to better illustrate this process, FIG. 9 shows different wavelength undulating lines, intended to represent that chamber 3 contains the liquid at a higher energy level (temperature), and chambers 4 and 5 hold liquid at a lower energy level (temperature) while the valves-module continues to supply fresh hot or cold water (16). The device operation is described below:

- A.—Hot water from the water-heater enters through the hot-water inlet (22) once the hot water solenoid valve (17) is opened by the coil; this water passes through the connecting pipe between the valves-module (16) and the dispersion pipe (14) to supply the mixing container with hot water (3). On the other hand, as per the control's request (27), cold water (at ambient temperature) coming from the hydraulic network, enters through the cold-water inlet (23) once the cold water electronic valve is opened (18); the supplied amount of hot and cold water is regulated by the control board, to meet the user's particular requirements of desired water temperature; to this end, the device will first make use the preheated water contained in chambers 4 and 5 of the mixing container, before allowing any additional new water in from the cold or hot water inlets. In this way, all the water that would otherwise be wasted in previous technical systems is used as a water source for the desired service, illustrated here as a shower head.
- B.—The water contained in the first chamber (3) climbs to the second chamber (4) due to the pressure of incoming water, through the first interconnecting pipeline (12), and since the duct is located at the bottom of this chamber (3), the water flowing will be the one with the lowest temperature; all the while, in the second Chamber (4) the same process will be repeated towards the third chamber (5) by means of a second interconnecting pipeline (13), where the internal chambers of the mixing container will maintain the water at different temperatures, given that the mixing container is duly insulated (thermally) to avoid heat loss.
- C.—Subsequently, the water inside the mixing container (1) is distributed in accordance with the thermal convection effect, gathering the hottest water in the upper portion of the first chamber (3), and the water with a lower temperature will gather in the second chamber (4), so that water at the lowest temperature of the three chambers will gather in the third chamber (5);
- D.—When the user requires hot water, he may choose the desired temperature from the selected set, which runs from 25° C. to 50° C., using the temperature dial (30), and then press the on-switch (29) on the control board (27), with this action, the algebraic thermal sensor (2) and the level sensors (15) emit a signal that reports the device's temperature and state of operability along chamber 3, by means of the dynamic temperature indicator, composed of a set of ten indicator lights where the first two—blue—(28-1 to 28-2) indicate the water's temperature is below the selected range; the next two lights—blue and green—(28-3-28-4) indicate the water's temperature is already at the lower limit of the desired range; the following two green lights (28-5-28-6) indicate the water temperature is at the center of the desired temperature range; the ensuing two lights—green and red—(28-7 to 28-8) indicate that water is in the upper limit of the desired temperature range, and the last two lights—red—(28-9-28-10) indicate that the water temperature is above the desired range, which means that when at least one green light is lit on the dynamic temperature indicator, the water temperature is already within the desired range.

On the other hand, the control board has a red light (32) to indicate that the water tank is full; a second red light (33) to indicates that the device is lacking hot water (this happens when the heater fails to supply hot water and the first chamber is already full); a third red light (34) indicates that there is no cold water in the first chamber (3), and the last red light (35) lights when all the chambers are empty.

It should be noted that the temperature in chamber 3 is not completely uniform due to the fact that on the right side of the chamber it is supplied by either hot or cold water, while through the interconnection pipe (12) the water supplied is at a given temperature. The algebraic thermal sensor registers the temperature at different points in the chamber and reports an average or weighted average of these values in order to establish the approximate temperature at the center of chamber 3 at the exit 17A to the desired service. [Chamber 3 is connected to a first pipe (19A), an outlet valve (19), and through a second pipe (19B) to the shower (20).]

When the water temperature in the first chamber is out of the range of desired temperature, the control board orders the opening of either the solenoid cold-water valve (18) or the hot-water solenoid valve (17) as needed, to allow for a controlled water supply in each case in order to obtain the desired temperature;

E.—The user opens the outlet valve (19) of the shower head or faucet (20), arranged at the bottom of the mixing container (1) allowing water to establish a circulating flow through gravity. Hot water flowing from the first chamber (3) mixes with the water in the second chamber (4) and with the water in the third Chamber (5), and if needed, more water is supplied from the electronic valves-module water inlet (16) in accordance with the signals received by the control board from the algebraic thermal sensor (27).

In this way, only the first storage chamber is refilled as needed, which considerably reduces the use of hot water coming from the heater.

The present invention is, hence, a lot simpler to assemble, and therefore a cheaper device.

The present invention, proposes a fabrication method for the mixing container that utilizes two metal plates, joined by either an electric welder, or a flanged or pressure union, resulting in a single-piece device of quick and easy manufacturing, as well as low-cost, lightweight and resistant, which may or may not have a thermally insulated coating, preferably fiberglass.

Given that the present invention is manufactured by means of simple sheet die-cutting, it is affordable to both moderate and high production levels; in addition to the fact that the use of only two components to form the collector makes it extremely cheap and light.

When the water mixing process begins, water from the pipe fills the first chamber (3) and colder water begins to flow to the second chamber (4); as the hot water flow increases, cold water runs to the third chamber (5). The positioning of the chambers in the device allows for an optimal use of temperature gradients.

Water Inlet

Figure 2:
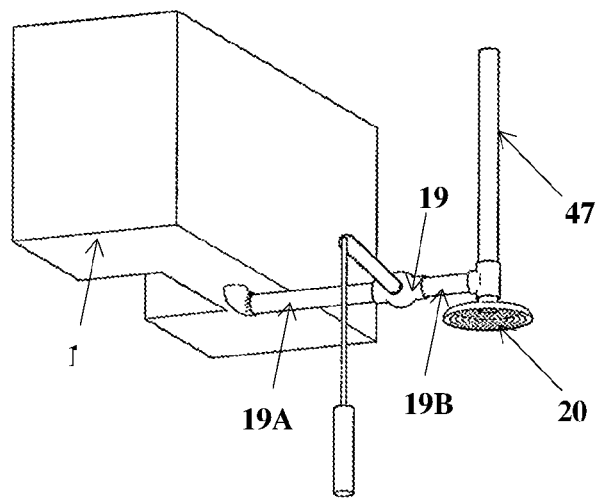
FIG. 2 shows an isometric right bottom view of the mixing container of the device meant to maximize the efficiency and minimize the consumption of water and energy in the present invention.

FIG. 2 illustrates the device so that the following fixtures are identified: the mixing container (1), the valves-module water inlet (16), the water outlet pipe (19A), the outlet valve (19) and the water outlet pipe extension (19B), towards the shower head (20), where there is a vent pipe at the shower head's exit (47) which allows water to flow through gravity.

Water Outlet

Figure 3:
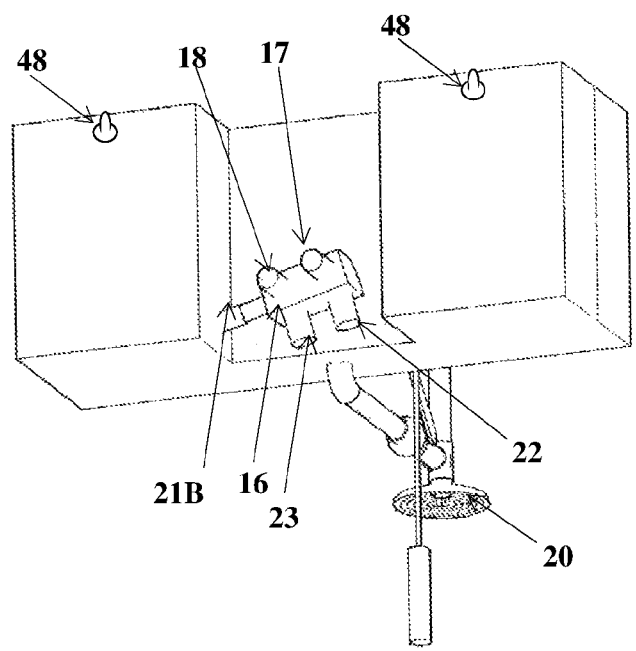
FIG. 3 shows a rear isometric view of the mixing container of the device meant to maximize the efficiency and minimize the consumption of water and energy in the present invention.

FIG. 3 illustrates a rear view of the device, where the following fixtures are identified: the water valves-module inlet (16), the water outlet pipe (19A), the spout valve (19) and the water outlet pipe extension (19B), towards the shower head (20), where there is a vent pipe at the shower head's exit (47). The water-drop to the service happens preferably through gravity.

Algebraic Thermal Sensor

Figure 4:
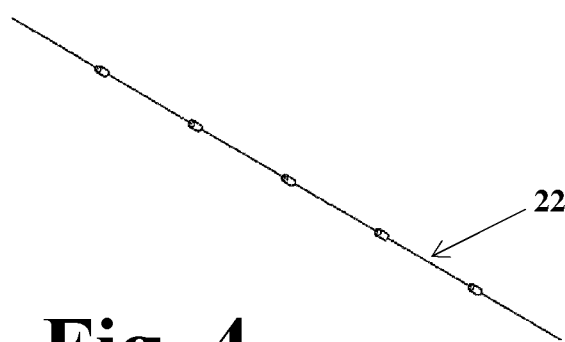
FIG. 4 shows a view of the algebraic thermal sensor of the device meant to maximize the efficiency and minimize the consumption of water and energy in the present invention.

FIG. 4 shows an isometric view of the algebraic thermal sensor (2) and its components, the algebraic thermal sensor comprises between 5-15 semiconductors connected in series; in the representation of FIG. 4 there are five semiconductors connected in series, which work on the principle of semiconductor conductivity, greatly affected by the temperature it may be exposed to; this requires a manufacturing methodology where the batch of semiconductors are sectioned so that their conductive impedance at 40° C. remains under a 0.5% variation range, allowing each of them to contribute to the value of the circuit series' total impedance when arranged along the instrument, resulting in an impedance algebraic sum.

Control Board.

Figure 5:
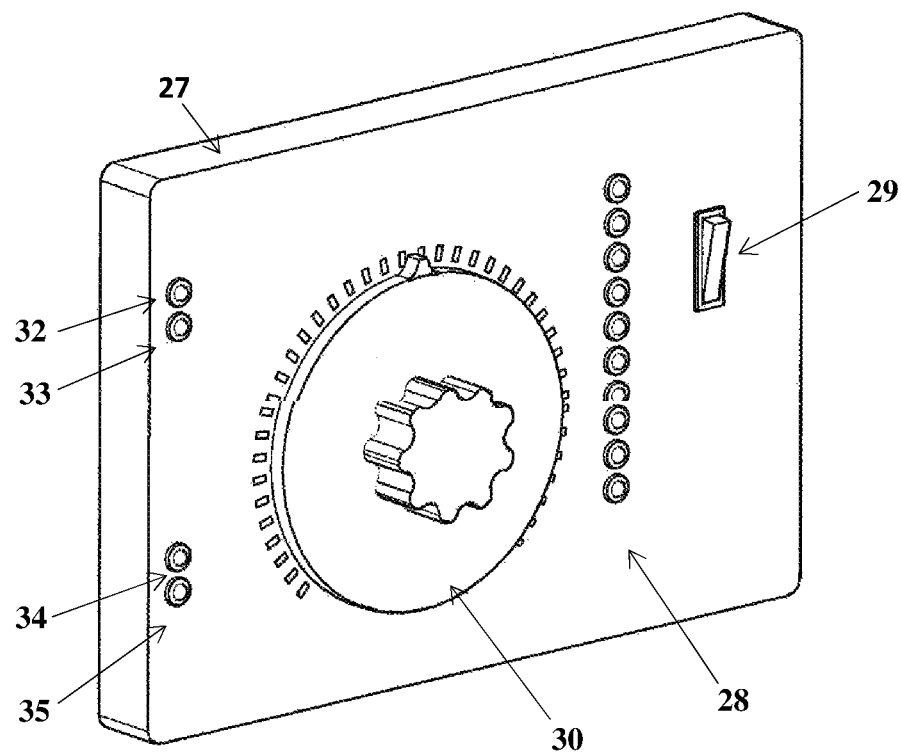
FIG. 5 shows a front isometric view of the control board of the device meant to maximize the efficiency and minimize the consumption of water and energy in the present invention.

FIG. 5 illustrates a control board (27)—preferably a controller—that regulates the device's operation through the codification of signals emitted by the sensors by means of an electronic circuit; said controller consists of a general on-off switch (29), an electric power input (31), a dynamic temperature indicator (28), a temperature selector knob (30), an analog temperature-comparison control (shown in FIG. 6), a dispenser's time-modulator (illustrated in FIG. 6), the reference clock pulse-generator—PR (shown in FIG. 6), a dispenser (shown in FIG. 6) algebraic thermal sensor's signal-input cables (25), the level-sensors signal (26), and the output cables to the valves-module (16) to activate the coils of solenoid valves (17 and 18).

Figure 6:
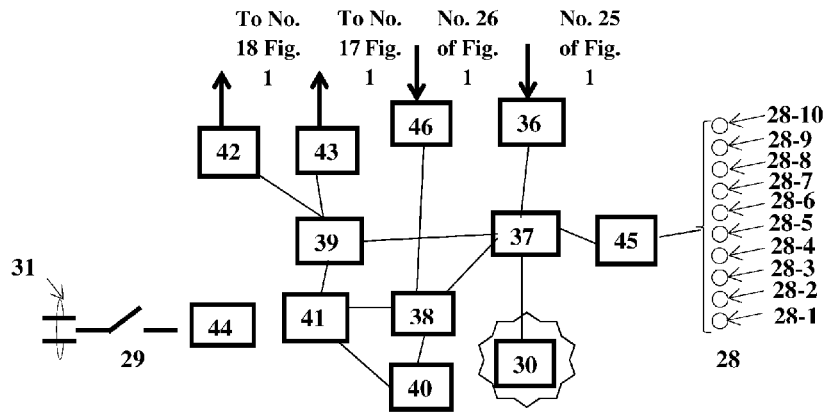
FIG. 6 shows the dispenser's time-modulator process graph, from the device meant to maximize the efficiency and minimize the consumption of water and energy in the present invention.

FIG. 6 illustrates a block diagram of the control board (27) that operates the device. The algebraic thermal sensor signal (25), the water-level sensors signals (26) and the electric-power input (31) enter the control board (27), signaling it to activate the outlet valve coils (17 and 18) in the valves-module inlet (16).

The signal provided by the algebraic thermal sensor (25) connects to the average-temperature gauge (36), and its output is compared to the selector-knob's desired-temperature signal (30) in the analog temperature-comparison control (37) which, in turn, sends the result of said comparison to the dispenser's time-modulator (38) and to the selector of the valve to operate (39); the dispenser's time-modulator (38) makes use of the reference-clock pulse-generator signal PR (40) and the signal from the analog temperature-comparison control (37) to determine the pulse's duration from the dispenser (41). This last one, on its part, (41) generates a synchronized pulse from the pulse generator (40) as per the value requested by the dispenser's time-modulator (38). At this point, this information is sent to the valves selector-knob (39), which then makes use of the information from the analog temperature-comparison control (37) and commands the activation of the hot (17) and cold (18) water solenoid valves through the hot and cold water controls (42 and 43) respectively.

Figure 8:
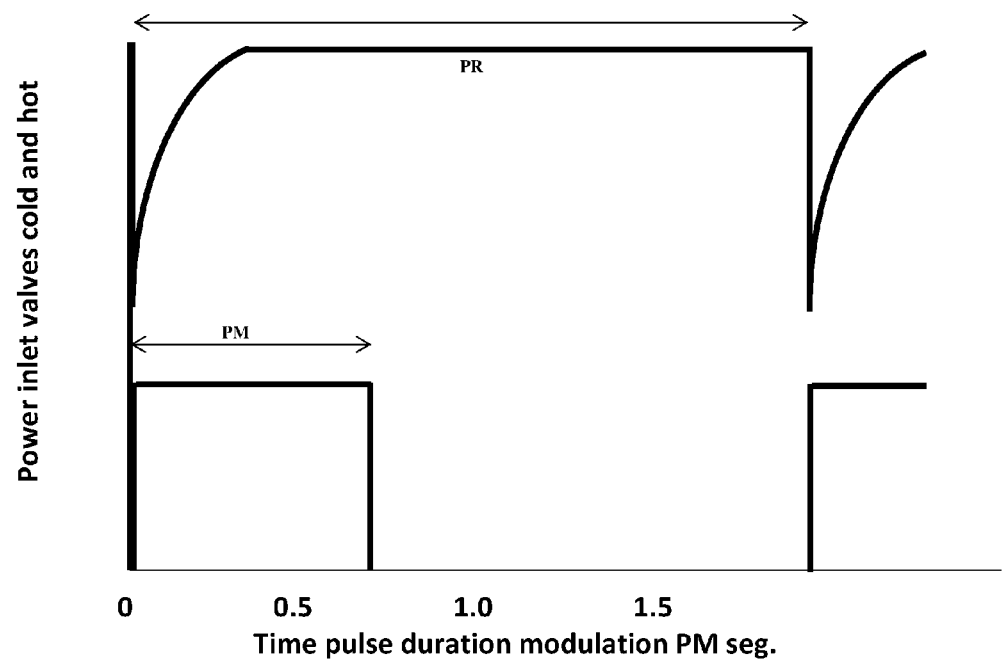
FIG. 8 shows the dispenser's cold and hot water inlet valve-module controls' operation graph from the device meant to maximize the efficiency and minimize the consumption of water and energy.

These controls include an on-off circuit activated through the concept of zero-positive crossing, programmed to turn off after it strikes the negative pulse, in order to guarantee the life of the valves (see FIG. 8).

The dynamic temperature indicator (28) is controlled by the dynamic control module (45) which receives information from the analog temperature-comparison control (37), and finally the level-sensors signal (26) enters the water-level position encoder (46) ordering the start or forced stop of the system, if necessary, to keep the device in operation.

Figure 7:
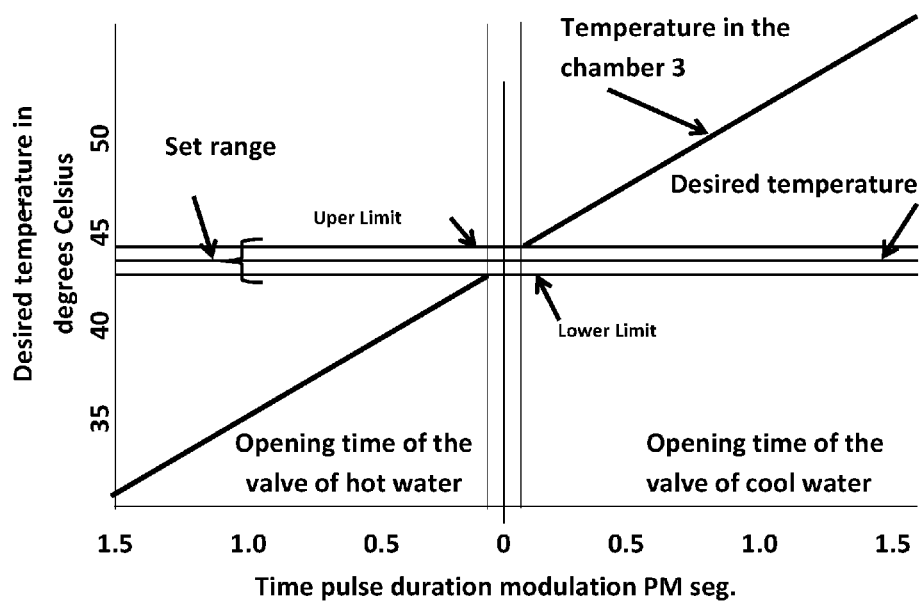
FIG. 7 shows the dispenser's operation graph, from the device meant to maximize the efficiency and minimize the consumption of water and energy in the present invention, showing the on-off time ratio required for proper operation.

FIG. 7 illustrates the operation graph of the dispenser's time-modulator (41) of the present invention's device, according to the difference in values between the desired temperature and the existing temperature in the first chambers (3).

In accordance with the present invention, depending on how off-range is the temperature in the first chamber (3) from the desired temperature range set, this circuit determines the duration of the corresponding valve's on-pulse in order to achieve the desired temperature as quickly as possible.

As seen in FIG. 7, if water temperature in chamber 3 is below the desired temperature range set by the user, say 40° C., the hot-water valve is activated for an opening time of approximately 0.4 seconds (according to the chart). On the other hand, if at a given moment, the temperature of the first chamber (3) is, say, at 48° C. the opening time of the cold-water valve would be approximately of 0.8 seconds as shown in the figure.

FIG. 8 illustrates the dispenser's (41) operation chart describing the on-off timing required in synchrony with the reference-clock generated pulse (40).

As seen in FIG. 8 the reference-clock pulse is synchronized whenever the valve-module needs to be turned on. Simultaneously, the corresponding valve is activated and in operation until the set time ends. If the right temperature has not been achieved, the valve opens again at the next reference-clock pulse for a period of time that is determined by the modulator. As seen in FIG. 8, at the beginning of this process, when the temperature is far from the desired range, the corresponding valve opens in rhythm with the reference-clock pulse length, for example, first in 1.5 seconds, after a while, in 1 second, then 0.7 seconds, then 0.5 seconds, until the valve ultimately stops opening altogether; this can be defined as a process of successive approximations with different water volumes in each case, in order to achieve the desired temperature. Each valve-opening event provides a different volume.

FIG. 9 illustrates the controls (42 and 43) graph where said controls use an on-off circuit activated through the concept of positive zero crossing, and deactivated after the negative pulse value (the negative area of the sinusoid signal) to guarantee the life of the valves-module inlet. This means that the valve coils will always operate in complete cycles according to the voltage input, preventing inadequate impedances upon connecting. If the coils were to turn on in positive and switch off again into the negative, the new pulse would face very low impedance at the core of the coil, which would damage it.

THE DEVICE CONSISTS OF THE FOLLOWING PARTS

1. Storage mixing container,
2. Algebraic thermal sensor,
3. First chamber,
4. Second chamber,
5. Third chamber,
6. First chamber's delimiter,
7. Second chamber delimiter,
8. First chamber's vent pipe,
9. Second chamber's vent pipe,
10. Third chamber's vent pipe,
11. Third chamber's overflow drain pipe,
12. First interconnection pipe,
13. Second interconnection pipe,
14. Dispersion pipe with nozzles,
15 Level sensors,
16. Valve-module water inlet,
17. Hot-water electric solenoid valve,
18. Cold-water electric solenoid valve,
19. Device's water-outlet valve,
19A. Hot-water outlet pipe, between the device and the outlet valve,
19B. Hot-water outlet pipe, between the outlet valve and the shower head,
20. Shower head or faucet,
21. Main supply pipe line,
21A. Main pipe's section connected to the dispersion pipe.
21B. Main pipe's section connected to the valves-module,
22. Hot-water inlet,
23. Cold-water inlet,
24. Excess-water exit to the water-recovery tank
25. Algebraic-thermal-sensor control lines,
26. Water-level sensors' control lines,
27. Control board,
28. Dynamic temperature indicator,
29. Power switch,
30. Desired-temperature reader,
31. Electric-power input cable,
32. Full-mixing-container indicator,
33. Lack-of-hot-water indicator,
34. Lack-of-cold-water indicator,
35. Empty-mixing-container indicator,
36. Average-temperature meter,
37. Analog temperature-comparison control,
38. Dispenser's time-modulator,
39. Valve or valves selector-knob,
40. PR—Reference-clock pulse generator,
41. Dispenser,
42. Cold-water valve-coil control,
43. Hot-water valve-coil control,
44. Energy-supply source,
45. Dynamic temperature-indicator control,
46. The water-level-position encoder,
47. Shower head vent pipe, and
48. Anchor brackets.

EXAMPLES

Example 1. Development of the Device to Minimize the Cost and Consumption of Energy and Water The Fabrication Method for this Invention was as Follows:
1. Sheets of foil were cut, at a 22-gauge to form the body of a container of substantially rectangular shape, with an outside cavity to contain the valves-module inlet. A cap of the same material was manufactured in this same way, and each chamber was independently coated with fiberglass on its outer part;
2. Drillings were made on the back of the container to place the valves-module, and at the bottom of the device to set the water-outlet pipe;
3.—The dispersion pipe was connected to the main water-inlet pipe;
4. The algebraic thermal sensor was installed and fastened to the dispersion pipe with plastic belts;
5. The first delimiter, pre-drilled for the interconnection and the vent pipes, was installed and sealed using high temperature silicone;
6. The second chamber delimiter was installed, which included three holes: the first hole for the interconnection pipeline, another for the first chamber's vent pipe, and the third hole for the second chamber's vent pipe; and it was sealed using high temperature silicone;
7. The chamber-overflow drain pipe was installed and connected to a water-recovery container;
8. The cap of the mixing container, drilled for three holes, is set on top of the container. The first hole allows the first chamber's vent pipe to go through, the second hole is for the second chamber's pipe, and the third one is for the third chamber's vent pipe. The water-level sensors are placed inside the first chamber's vent pipe; and then, the water-level sensors and the algebraic thermal sensor are wired, exiting the mixing container through the first Chamber's vent pipe;
9.—The container is installed on the bathroom's wall, using anchor brackets and connected to the hot and cold water inlets from the local network;

10.—The cables from the water-level sensors and the algebraic thermal sensor are guided through a plastic duct and connected to the control board; and 11. The control panel is attached to the bathroom wall and connected to the local electrical network, covering the wiring with plastic conduit wrap.

Example 2. Maintenance

The maintenance of the device to reduce the cost and consumption of energy and water comprises the following steps.
(a) Disconnect the control board from the local electric network;
(b) Disconnect the hydraulic network connections and drain the water contained in the storage chambers,
(c) Dismount the device from the wall, the maintenance procedure includes the successive washing of the mixing container, using dissolved chemical and biological agents, in order to remove any fouling and algae and to sanitize the mixing container.
(d) Verify the proper functioning of the valves-module water inlet, including both valves and coils, and replace or substitute them when necessary;
(e) Verify the good condition of the water inlet and outlet pipes and clean them, or replace them if necessary;
f) Verify that the algebraic thermal sensor and the level sensors are in good condition, and if replace them if needed;
(g) Verify that the dispersion pipe is in good condition, clean the nozzles, and replace them when necessary;
(h) Check that the outlet valve and the shower head are working well; otherwise, replaces them;
(i) Reassemble the mixing container with its parts and accessories and mount it on the wall.
j) Connect the hot and cold water inlets from the local network, and
(k) Hook up the control board to the local energy power network.

The foregoing description includes any combination or sub-combination of the elements of different types and/or modalities described herein.

Someone with technical knowledge on the subject will recognize that these characteristics, and hence the scope of this disclosure shall be interpreted in light of the following vindicating claims and any of their equivalences.

The invention claimed is:

1. A device for supplying water at a controlled temperature to an outlet water line from incoming supply lines of cold and hot water supply lines, said device comprising:
   a storage tank comprising a plurality of chambers, wherein a first chamber is connected to a cold water inlet supply line, a hot water inlet supply line and an outlet supply line, wherein the chambers of said plurality of chambers are arranged one above the other and connected in series, wherein each chamber, except a topmost chamber, is contiguously connected at its bottom through a water passage to its adjacent top chamber;
   a first solenoid valve mounted in-line of said cold water inlet supply line, and a second solenoid valve mounted in-line of said hot water inlet supply line;
   an algebraic thermal sensor, placed in said first chamber, configured to detect water temperature in said first chamber and send an input electrical signal; and
   a controller configured to receive said input electrical signal from said algebraic thermal sensor and send a plurality of output electrical signals to control said first solenoid valve and said second solenoid valve.

2. The device of claim 1 is further characterized in that said outlet supply line is located at the center of said first chamber.

3. The device of claim 1, wherein said algebraic thermal sensor is configured to measure an average temperature along a length of said tank, said algebraic thermal sensor further comprising between five (5) and fifteen (15) semiconductors connected in series, which are sectioned to keep their conduction impedance within less than a 0.5 variation range at 40° C.

4. The device of claim 1, wherein said tank is thermally insulated to minimize heat loss.

5. The device of claim 1, wherein said plurality of chambers are separated by a plurality of chamber delimiters.

6. The device of claim 5, wherein each of said plurality of chamber delimiters has a slope of at least a 10%.

7. The device of claim 1, wherein said controller further comprises a metering unit for controlling cold and hot water flow using said plurality of output electrical signals to control said first solenoid valve and said second solenoid valve.

8. The device of claim 7, wherein said controller further comprises:
   an average-temperature gauge for receiving said electric signal from said algebraic thermal sensor and generating an average-temperature signal;
   a selector-knob for receiving user input of the desired temperature, and generating a desired-temperature signal;
   an analog temperature-comparison control for comparing said average-temperature signal with said desired-temperature signal and generating a comparison signal; and
   a time modulator for receiving said comparison signal and a time pulse from a reference clock, and determining the duration of said plurality of said output electrical signals to control said first solenoid valve and said second solenoid valve.

9. The device of claim 8, further comprising:
a dynamic control module for receiving information from said analog temperature-comparison control and generating a temperature indication signal; and
a dynamic temperature indicator for receiving said temperature indication signal and displaying temperature level.

10. The device of claim 7, further comprising:
a plurality of level-sensors for detecting water level in said tank and generating a plurality of water level signals;
a water-level position encoder; and
a plurality of water level indicators.

* * * * *